3 Sheets—Sheet 1.

E. B. WHITMORE.

Assignor of one-half to L. EMERY, JR.

MIDDLINGS PURIFIER.

No. 11,245. Reissued June 21, 1892.

Witnesses
P. L. Kobbe
M. B. O'Doherty

Inventor
Edwin B. Whitmore
By Mo. L. Sprague & Son
Attys.

THE NORRIS PETERS CO., PHOTO-LITHO., WASHINGTON, D. C.

3 Sheets—Sheet 2.
E. B. WHITMORE.
Assignor of one-half to L. EMERY, JR.
MIDDLINGS PURIFIER.
No. 11,245. Reissued June 21, 1892.
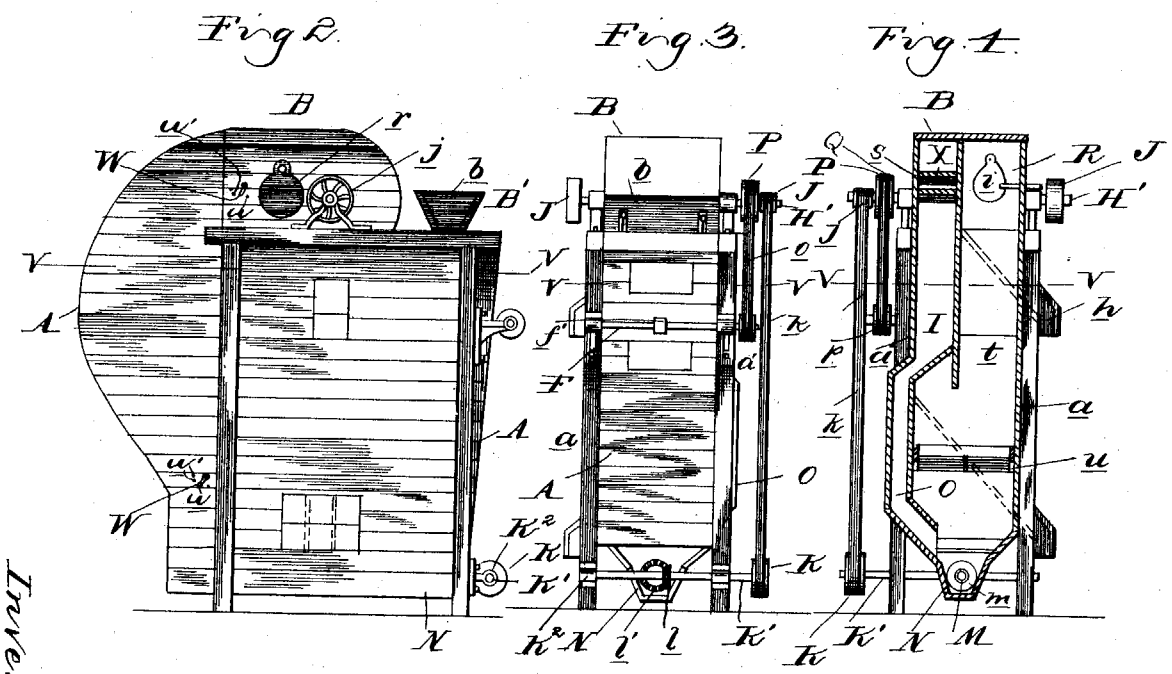
Inventor
Edwin B. Whitmore
By Mc. Sprague & Son
Attys.
Witnesses
A. L. Stobbie
Th B. O'Doherty.
THE NORRIS PETERS CO., PHOTO-LITHO., WASHINGTON, D. C.

E. B. WHITMORE.

Assignor of one-half to L. EMERY, JR.

MIDDLINGS PURIFIER.

No. 11,245. Reissued June 21, 1892.

Witnesses
A. L. Hobbie
M. B. O'Dogherty.

Inventor
Edwin B. Whitmore
By Mott & Sprague Sons
Attys.

THE NORRIS PETERS CO., PHOTO-LITHO., WASHINGTON, D. C.

UNITED STATES PATENT OFFICE.

EDWIN BURR WHITMORE, OF THREE RIVERS, MICHIGAN, ASSIGNOR OF ONE-HALF TO LEWIS EMERY, JR., OF BRADFORD, PENNSYLVANIA.

MIDDLINGS-PURIFIER.

SPECIFICATION forming part of Reissued Letters Patent No. 11,245, dated June 21, 1892.

Original No. 458,511, dated August 25, 1891. Application for reissue filed March 19, 1892. Serial No. 425,651.

*To all whom it may concern:*

Be it known that I, EDWIN BURR WHITMORE, a citizen of the United States, residing at Three Rivers, in the county of St. Joseph and State of Michigan, have invented certain new and useful Improvements in Middlings-Purifiers; and I do hereby declare the following to be a full, clear, and exact description of the invention, such as will enable others skilled in the art to which it appertains to make and use the same.

My invention relates to a middlings-purifier for cereals; and its object is to produce a machine which can be easily worked, is economical in saving time and space, and will use the same air over and over without discharging it into the room and taking it up again with floating dust, thus rendering the product of the machine more pure and wholesome.

To these ends my invention consists in certain features of novelty to be hereinafter described, and then particularly pointed out in the claims.

In order that my invention may be fully understood, I will now proceed to describe the same with reference to the accompanying drawings, in which—

Figure 1:
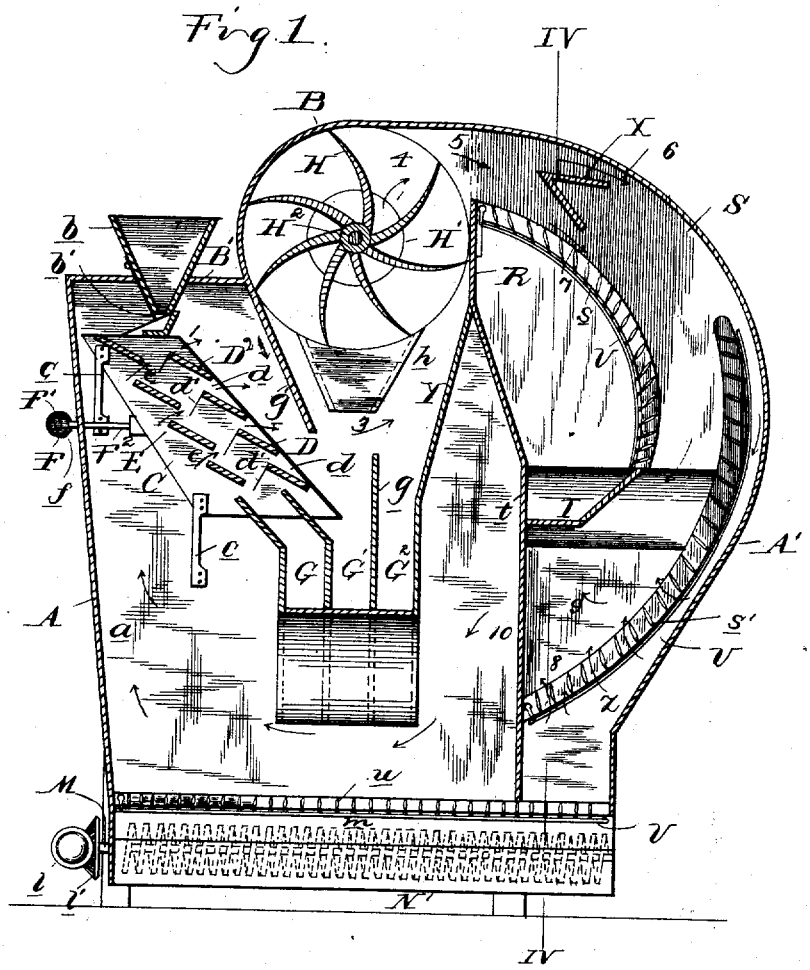
Figure 5:
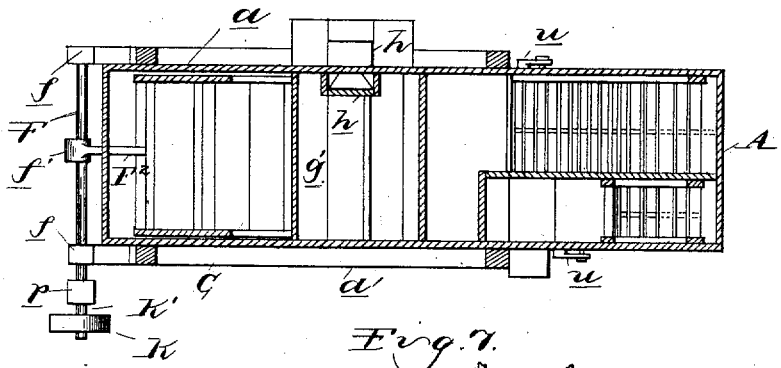
Figure 6:
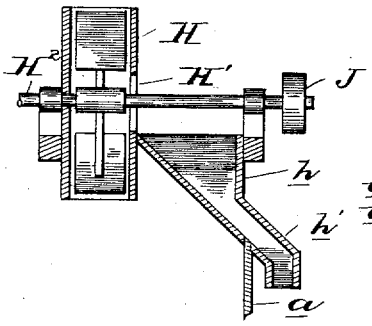
Figure 7:
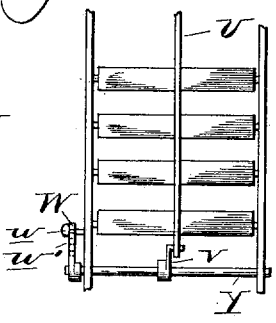
Figure 8:
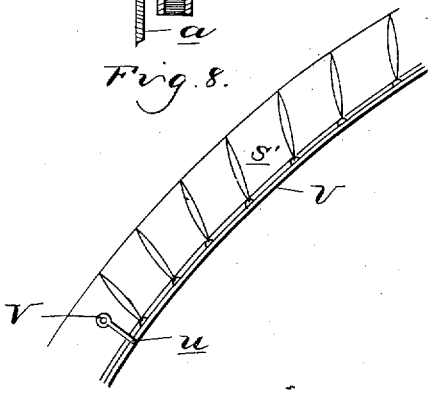

Figure 1 is a vertical longitudinal section of the machine. Fig. 2 is a side elevation thereof on a small scale. Fig. 3 is an end elevation. Fig. 4 is a vertical transverse section on line IV IV, Fig. 1. Fig. 5 is a horizontal section on line V V, Figs. 2, 3, and 4. Fig. 6 is a detail view of the fan and the dust pocket and spout. Figs. 7 and 8 are detail views showing the arrangement of the adjustable slats.

*a a'* indicate opposite sides of the casing of the machine, A A' the ends, of which end A' is curved, and B B' the top, of which part B' is lower than part B.

*b* is the hopper, below which is an adjustable cut-off *b'* for regulating the amount of material falling out of the hopper. Below the hopper and cut-off is a vibrating shoe C, supported by spring-bars *c* on the inner side of the casing, which hold it in position and permit it to vibrate longitudinally of the casing. Arranged in oblique series are inclined cant-boards D, which slightly overlap, leaving spaces *d*. Projecting downwardly from the upper edges of the cant-boards D, at right angles thereto, are strips or middlings-arresters *d'*. Another oblique series of inclined slightly-overlapping cant-boards E, separated by spaces *e*, are arranged behind the series of cant-boards D in such position as that the middlings-arresters *d'* will extend toward the mid-width of the boards E under them.

F is a shaft journaled transversely of the casing in boxes *f* and is provided with an eccentric F', that turns within an eccentric-ring *f'*, carried at one end of rod $F^2$, which passes through the casing and is connected at its other end with shoe C, whereby it is vibrated by the revolution of the shaft F.

G is a spout to discharge purified middlings, G' a spout to discharge second middlings, and $G^2$ a spout to discharge tailings. The spout G is situated directly under the shoe C, and spouts G' and $G^2$ are alongside thereof, and all project in inclined position to the outside of the casing. The wall *g*, between the spouts G' and $G^2$ is prolonged upwardly. In front of the shoe C is arranged a shield-board *g'*, inclined away from the shoe and extending from the top part B' of the casing. At the top of and to one side of the casing is a rotary exhaust-fan H for causing the air to circulate in a continuous current through the machine. Communicating with the opening H' at the side of the fan is a dust-pocket *h*, open at top, from which a spout *h'* leads to the outside of the casing.

I is a vacuum dust-chamber below the mouth of the fan.

On one end of the fan-shaft $H^2$ is a main drive-pulley J, which may be driven from any suitable or convenient source of power. On the other end of the shaft $H^2$ is a belt-pulley *j*, over which and over a belt-pulley K passes a belt *k*, said pulley being located at one end of a transverse shaft K', journaled in boxes $K^2$ at the lower end of the machine. Meshing bevel gear-wheels *l l'*, fixed, respectively, on shaft K' and shaft M, rotate the latter and a spiral conveyer *m* or other suitable device mounted thereon. The conveyer *m* works in a trough N, extending longitudinally of the bottom of the casing.

Communicating at its upper end with dust-chamber I and at its lower end with conveyer *m* is a spout O at one side of the machine.

Located on the end of fan-shaft $H^2$, contiguous to the pulley *j*, is another pulley P, over which and over pulley *p* at one end of the shaft F a belt Q passes, so as to rotate the latter.

*r* is a valve for closing a hand-hole at one side of the machine for affording access to valve *i*, which closes an opening in the transverse partition R at the side of the mouth of the fan. The mouth of the fan opens into a curved channel S, at the front and back of which are two series of adjustable curved slats *s s'*, respectively, which form said channel between them. At the front side of the lower end of this channel is a vertical partition *t*, arranged transversely of the casing.

Above the spiral conveyer *m* is a series of horizontal slats *u*. These slats operate similar to the folding slats of a window-shutter, and each series is operated by a rod U, connected with the crank *v* on a rock-shaft V, Fig. 7. At one end of said shaft is an arm W, which is perforated for the passage of a pin *w*, which engages one of a series of holes *w'* in the casing and holds the slats to desired position.

X is a V-shaped divider-board arranged at the inner end of channel S, just in front of the mouth of the fan.

The operation of the machine is as follows: The middlings are fed through the hopper and fall onto the shoe, first falling against the upper cant-board E and the upper middlings-arrester *d'*, then upon the next cant-board E below, to permit the middlings to be thoroughly aerated, and so on down to the purified-middlings discharge-spout G, the arresters *d'* preventing the heavier middlings from being thrown onto the cant-boards D. As the middlings pass through the intervals between the cant-boards, the air-currents (indicated by arrows 1 1) carry away and separate the dust and fluff from the middlings. The dust-laden air-currents after passing through the cant-boards are deflected by the shield-board *g'* in the direction of arrow 2 and strike the extended wall *g*, causing the heavier particles to fall into spout G'. The air-currents pass upwardly in the direction of arrow 3 and strike against the inclined partition Y, causing the heavier particles to fall into the spout $G^2$. As the air passes on to the fan through its side opening H', as indicated by arrow 4, it must turn back over the edge of dust-pocket *h*, causing the heavier particles to fall thereinto. As the air passes out of the mouth of the fan, as indicated by arrow 5, the current is divided by the V-shaped divider-board X, passing in two currents, respectively, above and below it, as indicated by the arrows 6 and 7. The lower current is forced against the dust-arresters *s*, the heavier particles of the dust-laden air falling through between the slats into the vacuum-chamber I, and through the spouts O to conveyer *m*. The upper current is thrown against the outer wall of the dust-channel S, causing it to pass behind dust-arresters *s'*, the heavier particles falling through the expansion-chamber Z directly into conveyer *m*, and said current expanding in the chamber Z and passing upward through between the slats, as shown by arrows 8 8. The air-current now passes up over the partition *t* back to the vibrating shoe, in the direction indicated by arrows 9, 10, and 11, and proceeds as before.

The air-regulating valve *i* is used to regulate the draft through the middlings as it passes over the cant-boards of the vibrating shoe. This is accomplished by opening said valve, when some of the dust-laden air passes direct from behind partition *t* to the fan. By this means a short circuit for the air is established when the damper or valve is opened between the suction and discharge, and the air-currents are partly or wholly cut off from the cant-boards.

What I claim as my invention is—

1. In a middlings-purifier, a vibrating shoe provided with two oblique series of spaced inclined cant-boards, one series being in advance of the other and the boards of which series are provided at their upper edges with middlings-arresters extending downwardly at right angles thereto and located directly opposite and also at right angles to the boards of the rear series, substantially as and for the purpose set forth.

2. In a middlings-purifier, a vibrating shoe, a fan, a dust-chamber, a conveyer, a spout leading from the dust-chamber to the conveyer, and two series of slats arranged one on each side of an air-channel leading from the fan, substantially as and for the purpose set forth.

3. In a middlings-purifier, a vibrating shoe, a fan, an air-channel leading from the fan, a divider in front of the mouth of the fan, and a series of dust-arresters on each side of the channel, substantially as and for the purpose set forth.

4. In a middlings-purifier, the combination, with the casing having a separating-chamber and a continuous air-passage, of separating means in the chamber, a fan in the passage having direct communication with the chamber, a dust-chamber, and a short-circuiting damper between the dust-chamber and fan, substantially as described.

5. In a middlings-purifier, the combination, with the casing, of separating means in the casing, a fan, a suction-channel connecting the fan with the chamber, having the separating means, a dust-chamber, a discharge connection from the fan to the same, and a damper between the discharge and suction, located at a point between the fan and separating means, substantially as described.

6. In a middlings-purifier, the combination, with the separating devices, of a channel leading from and returning thereto, a fan in said channel, adapted to circulate the air, and a damper controlling a short circuit, including the fan and excluding the separating device, substantially as described.

EDWIN BURR WHITMORE.

Witnesses:

J. B. BURNS,

L. T. WILCOX.